US010084680B2

(12) United States Patent
Dolson et al.

(10) Patent No.: US 10,084,680 B2
(45) Date of Patent: *Sep. 25, 2018

(54) SYSTEM AND METHOD FOR SUBSCRIBER AWARE NETWORK MONITORING

(71) Applicant: SANDVINE INCORPORATED ULC, Waterloo (CA)

(72) Inventors: David Cameron Dolson, Waterloo (CA); Travis James Willard, Waterloo (CA); Douglas Arthur Fickling, Waterloo (CA); Jeffrey Thomas Begley, Waterloo (CA); Dror Yehuda Shilo, Jerusalem (IL)

(73) Assignee: Sandvine Incorporated ULC, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,293

(22) Filed: Jul. 17, 2017

(65) Prior Publication Data
US 2017/0373961 A1    Dec. 28, 2017

Related U.S. Application Data

(63) Continuation of application No. 15/095,326, filed on Apr. 11, 2016, now Pat. No. 9,712,421, which is a
(Continued)

(51) Int. Cl.
*H04L 12/28* (2006.01)
*G06F 15/16* (2006.01)
(Continued)

(52) U.S. Cl.
CPC ............ *H04L 43/12* (2013.01); *H04L 45/741* (2013.01); *H04L 61/2514* (2013.01); *H04L 63/306* (2013.01)

(58) Field of Classification Search
CPC ... H04L 43/12; H04L 45/741; H04L 63/0272; H04L 61/2514; H04L 63/306;
(Continued)

(56) References Cited

U.S. PATENT DOCUMENTS 7,281,059 B2 * 10/2007 Ryu .................. H04L 29/12216
709/220
7,606,191 B1 * 10/2009 Breau ................. H04L 12/4641
370/328
(Continued)

FOREIGN PATENT DOCUMENTS

EP      1054529     11/2000
EP      1725007     11/2006

OTHER PUBLICATIONS

Rekhter, Y. et al., "Address Allocation for Private Internets", Network Working Group, BCP 5, RFC 1918, pp. 1-9, Feb. 1996.
(Continued)

*Primary Examiner* — Edan Orgad
*Assistant Examiner* — Vanneilian Lalchinthang
(74) *Attorney, Agent, or Firm* — Gowling WLG (Canada) LLP; Neil W. Henderson (57) ABSTRACT

A system and method for subscriber aware network monitoring is provided. The method includes: determining subscriber and session data, wherein the subscriber has a non-unique IP (Internet Protocol) address; retrieving identifying data from a packet; and comparing the identifying data with the determined subscriber and session data to determine the subscriber associated with the packet. The system includes: at least one network probe configured to determine subscriber and session data, wherein the subscriber has a non-unique Internet Protocol (IP) address; at least one traffic probe configured to retrieve identifying data from a packet; and a processing module configured to compare the identifying data with the stored subscriber and
(Continued)

session data to determine the subscriber associated with the packet.

18 Claims, 6 Drawing Sheets

Related U.S. Application Data continuation of application No. 14/010,911, filed on Aug. 27, 2013, now Pat. No. 9,313,126.

(60) Provisional application No. 61/804,858, filed on Mar. 25, 2013.

(51) Int. Cl.
*H04L 12/10* (2006.01)
*H04L 12/26* (2006.01)
*H04L 29/06* (2006.01)
*H04L 29/12* (2006.01)
*H04L 12/749* (2013.01)

(58) Field of Classification Search
CPC ... H04L 12/4641; H04M 3/2281; H04W 4/08; H04W 8/186
USPC .......................................................... 370/392
See application file for complete search history.

(56) References Cited

U.S. PATENT DOCUMENTS

| | | | |
|---|---|---|---|
| 2002/0136210 A1* | 9/2002 | Boden ................ | H04L 12/4641 370/389 |
| 2006/0083198 A1* | 4/2006 | Eidenschink ...... | H04B 7/18584 370/329 |
| 2006/0262736 A1* | 11/2006 | Dong ...................... | H04L 43/12 370/254 |
| 2006/0262742 A1* | 11/2006 | Dommaraju .......... | H04L 43/028 370/328 |
| 2010/0014459 A1* | 1/2010 | Mir ......................... | H04L 45/60 370/328 |
| 2011/0047256 A1* | 2/2011 | Babu ................ | H04L 29/12367 709/223 |
| 2011/0196977 A1* | 8/2011 | Lynch .................... | H04W 4/08 709/229 |

OTHER PUBLICATIONS

Weil, J. et al., "IANA-Reserved IPv4 Prefix for Shared Address Space", Internet Engineering Task Force (IETF), BCP 153, RFC 6598, pp. 1-11, Apr. 2012.
Blott, S.M. et al., "User-Level Billing and Accounting in IP Networks", Bell Labs Technical Journal, Oct. 1, 1999, pp. 237-251, vol. 4, No. 4, Wiley, California, United States of America.
European Patent Office, Extended European Search Report on European Patent Appln. No. 13181797.5, dated May 27, 2014.
European Patent Office, Examination Report on European Patent Appln. No. 13181797.5, dated Dec. 23, 2015.
United States Patent and Trademark Office, Office Action on U.S. Appl. No. 14/010,911, dated Feb. 13, 2015.
United States Patent and Trademark Office, Final Office Action on U.S. Appl. No. 14/010,911, dated Jul. 30, 2015.
United States Patent and Trademark Office, Notice of Allowance on U.S. Appl. No. 14/010,911, dated Dec. 2, 2015.
European Patent Office, Examination Report on European Patent Appln. No. 13181797.5, dated Oct. 7, 2016.
United States Patent Office, Office Action on U.S. Appl. No. 15/095,326, dated Aug. 26, 2016.
United States Patent Office, Notice of Allowance on U.S. Appl. No. 15/095,326, dated Mar. 16, 2017.

* cited by examiner

```
+Frame 1: 445 bytes on wire (3560 bits), 445 bytes captured (3560 bits)
+Ethernet II, Src: 02:e0:10:01:34:03 (02:e0:10:01:34:03), Dst: 02:e0:10:01:39:03
(02:e0:10:01:39:03)
+Internet Protocol Version 4, Src:151.0.0.1 (151.0.0.1), Dst: 152.0.0.1 (152.0.0.1)
+User Datagram Protocol, Src Port: microsan (20001), Dst Port: radius-acct (1813)
-Radius Protocol
   Code: Accounting-Request (4)
   Packet identifier: 0xc2 (194)
   Length: 403
   Authenticator: a9fa928ea22c91495bd4b70c4db8e40b
  -Attribute Value Pairs
     +AVP: l=25 t=User-Name(1):    67512020@sandvine.com
     +AVP: l=6  t=Framed-IP-Address(8): 4.6.38.212
     +AVP: l=6  t=Framed-IP-Netmask(9): 255.255.0.0
     +AVP: l=12 t=Called-Station-Id(30): 0067512019
     +AVP: l=12 t=Calling-Station-ID(31): 0067512020
     +AVP: l=6  t=Acct-Status-Type(40): Start (1)
     +AVP: l=14 t=Acct-Session-Id(44): 000067512021
     +AVP: l=6  t=Event-Timestamp(55): May 10, 2012 12:25:58.000000000 Eastern Daylight Time
     +AVP: l=23 t=Vendor-Specific(26) v=3GPP(10415)
     +AVP: l=24 t=Vendor-Specific(26) v=3GPP(10415)
     +AVP: l=18 t=Vendor-Specific(26) v=3GPP2(5535)
     +AVP: l=6  t=NAS-IP-ADDRESS(4):8.0.0.1
     +AVP: l=6  t=NAS-Port(5): 12345
     +AVP: l=6  t=Service-Type(6): Framed(2)
     +AVP: l=6  t=Framed-Protocol(7): PPP(1)
     +AVP: l=6  t=Framed-MTU(12): 1600
     +AVP: l=6  t=Framed-Compression(13): None(0)
     +AVP: l=61 t=Class(25): 6162636465666768696a6b6c6d6e6f707172737475767778...
     +AVP: l=6  t=NAS-Port-Type(61): Wireless-UMTS(23)
     +AVP: l=12 t=Vendor-Specific(26) v=3GPP(10415)
     +AVP: l=12 t=Vendor-Specific(26) v=3GPP(10415)
     +AVP: l=33 t=Vendor-Specific(26) v=3GPP(10415)
     +AVP: l=12 t=Vendor-Specific(26) v=3GPP(10415)
     +AVP: l=12 t=Vendor-Specific(26) v=3GPP(10415)
     +AVP: l=13 t=Vendor-Specific(26) v=3GPP(10415)
     +AVP: l=13 t=Vendor-Specific(26) v=3GPP(10415)
     +AVP: l=9  t=Vendor-Specific(26) v=3GPP(10415)
     +AVP: l=12 t=Vendor-Specific(26) v=3GPP2(5535)
```

FIG. 6

SYSTEM AND METHOD FOR SUBSCRIBER AWARE NETWORK MONITORING

CROSS REFERENCE TO RELATED APPLICATIONS

This application is a continuation of U.S. patent application Ser. No. 15/095,326, filed Apr. 11, 2016, which is itself a continuation of U.S. patent application Ser. No. 14/010,911, filed on Aug. 27, 2013, which claims the benefit of priority of U.S. Provisional Patent Application No. 61/804,858 filed Mar. 25, 2013, all of which are incorporated herein by reference in their entirety.

FIELD

The present disclosure relates generally to computer networks. More particularly, the present disclosure relates to embodiments for a system and method for subscriber aware network monitoring.

BACKGROUND

Network providers, such as Internet service providers (ISPs), typically monitor Internet Protocol (IP) traffic and network conditions using probe devices. Conventionally, probes receive a copy of traffic or are in the forwarding plane of the traffic, but the probe does not necessarily participate in the routing decisions of the network or act as an end-point. The probe is generally considered to be outside of the system the probe is monitoring. One class of probes inspects Internet packets and generates one or more of demographic (summary) reports, alerts, subscriber billing information, subscriber quota accounting or lawful interception/capture based on, for example:
Network conditions (e.g., outages, congestion);
Type of traffic (e.g., bulk or interactive);
Configured filter rules;
Subscriber attributes (e.g., contract-defined attributes); and
Subscriber state (e.g., within quota vs. over quota; worm infection).

The last two types of reports, in particular, require the probe device to associate packets with subscribers. This is typically done by using one of the IP addresses in the packet as a unique key and subscriber identifier.

Typically, ISPs provide connectivity to subscribers on the Internet, namely by forwarding IP packets to and from subscribers' devices, under various forms of contract. To enforce contract restrictions and to deliver upon obligations, it is important that ISPs be able to identify the subscriber associated with each IP packet.

Conventionally, Internet service providers allocate a public IP address to each subscriber, such that the IP address can be considered globally unique in representing the subscriber. However, the recent exhaustion of IPv4 addresses has led service providers to use or reuse private IP addresses among their subscribers such that the IP addresses may no longer be unique within the world or even unique within an ISP's network. In some cases, the IP addresses may only be unique within a private Local Area Network (LAN) or Virtual LAN (VLAN). These private networks are connected to the Internet through Network Address Translation (NAT) or Network Port Address Translation (NPAT) devices that dynamically map private IP addresses to public IP addresses and port ranges. An ISP may now assign "dynamic" IP addresses to subscribers, meaning a subscriber may be assigned any available address as opposed to being assigned a static address for an extended period of time.

This dynamic assignment of IP addresses can create difficulties in tracking subscriber specific data, with regard to at least the reports described above. Further, in a developing area of this nature, it is generally advantageous to improve on previous systems and methods.

SUMMARY

In a first aspect, the present disclosure provides a method for subscriber aware network monitoring including: determining subscriber and session data, at a network probe, wherein the subscriber has a non-unique IP (Internet Protocol) address; retrieving identifying data from a packet, at a traffic probe; and comparing the identifying data with the determined subscriber and session data to determine the subscriber associated with the packet.

In one case, the identifying data may include a combination of an IP address and port data.

In another case, the identifying data may include a combination of an IP address and a network identifier.

In yet another case, the method further includes: determining whether the identifying data from the packet indicates that the packet is from a public IP address; and associating the packet with the subscriber having the public IP address.

In one case, the method may further include producing network capacity planning reports based on an aggregated total of the compared data.

In another case, the method may further include determining billing based on the data.

In yet another case, the method may further include storing the identifying data and subscriber associated with the packet; and retrieving historical records indicating a relation between the subscriber and a non-unique IP address.

In another aspect, there is provided a system for subscriber aware network monitoring including: a traffic probe configured to determine subscriber and session data, wherein the subscriber has a non-unique Internet Protocol (IP) address; a network probe configured to retrieve identifying data from a packet; and a processing module configured to compare the identifying data with the stored subscriber and session data to determine the subscriber associated with the packet.

In one case, the identifying data may be a combination of an IP address and port data.

In another case, the identifying data may be a combination of an IP address and a network identifier.

In one case, the processing module may be further configured to: determine whether the identifying data from the packet indicates that the packet is from a public IP address; and associate the packet with the subscriber having the public IP address.

In another case, the processing module may be configured to produce network capacity planning reports based on an aggregated total of the compared data.

In yet another case, the processing module may be further configured to determine billing based on the compared data.

In yet another case, the system may also include: a memory module configured to store the identifying data and subscriber associated with the packet; and the processing module further configured to retrieve historical records indicating a relation between the subscriber and a non-unique IP address.

In one case, the network probe may be a Network Address Translation (NAT) probe and the traffic probe may be a NAT traffic probe.

In another case, the network probe may be an Authentication, Authorization and Accounting (AAA) probe and the traffic probe may be a private traffic probe.

In yet another case, the system may include at least two network probes, a Network Address Translation (NAT) probe and an Authentication, Authorization and Accounting (AAA) probe; and at least two traffic probes, a NAT traffic probe and a private traffic probe.

In yet another case, the system may further include: a database configured to store data related to subscribers and IP sessions; and a network interface configured to allow access to servers to query the database.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 6 is a table illustrating an example RADIUS message.

DETAILED DESCRIPTION

Generally, the present disclosure provides embodiments of a method and system for subscriber aware network monitoring. The system includes a network/traffic probe configured to identify network traffic and retrieve identifying data from the packet. The system is further configured to identify data related to network addresses and network qualifiers. The system is able to determine the relationship between the identifying data of the packet and network qualifiers and obtain subscriber identification for the network traffic.

Conventionally, probes are used as components of systems configured to charge subscribers for the amount of internet traffic each subscriber uses or components of systems configured to enforce subscriber quotas. The ability to correctly identify a subscriber for each packet is typically important in the implementation of an ISP's business model to ensure that the subscriber is billed properly and is limited to the appropriate quota. A probe capable of associating a subscriber with each Internet packet is termed "subscriber aware".

Conventional solutions to monitor subscribers in a network of private IP addresses require that a distinct subscriber aware probe system be deployed in each network of private IP addresses, such that no probe witnesses more than one domain of overlapping addresses. This conventional solution may not only result in the increased cost of deploying many probes and reporting systems, but may also be infeasible in some cases due to the nature of the network. Furthermore, conventional probe systems would generally not be capable of subscriber awareness on the Internet side of a Network Address Translation (NAT) device. Further, providers of Virtual Private Network (VPN) services or Network-as-a-Service (NaaS) may also permit their subscribers or customers to use any IP addresses in the virtual network that the provider is renting. These IP addresses commonly overlap with addresses in other virtual networks and may further overlap with IP addresses on the Internet.

The embodiments of the system for subscriber aware network monitoring are intended to implement subscriber awareness in a probe system when IP addresses alone are insufficient to be used as unique subscriber keys. The system allows virtual network identifiers to be used with private IP addresses, for example, IP addresses used within an enterprise, or shared addresses, such as, addresses used by service provider networks to accommodate the subscribers as public addresses are not available, to identify subscribers in a private network. The system described herein is also intended to allow subscriber awareness on the Internet side of a network device, for example, a NAT device, or a Carrier Grade NAT (CGN) device, or the like, where multiple users are sharing the TCP and UDP ports of a single public IP address.

In an embodiment of the system for subscriber aware network monitoring, the system provides a traffic probe on the Internet side of the NAT device or Network Port Address Translation (NPAT) device and then observes traffic for multiple subscribers or users that may be condensed into a single IP address, for example, using a scheme that relates different Transmission Control Protocol (TCP) and User Datagram Protocol (UDP) port sets to different subscribers, or the like.

Figure 1:
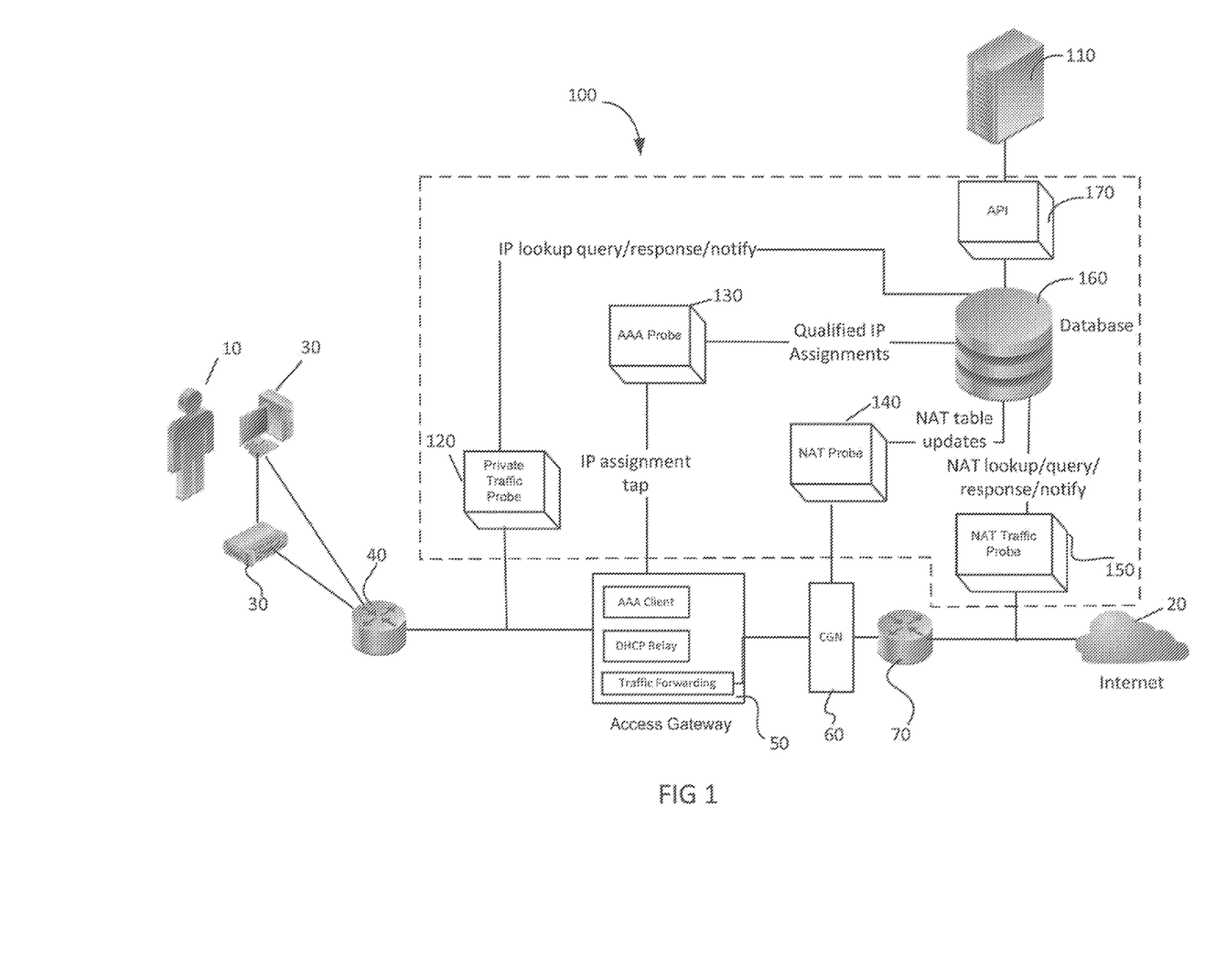
FIG. 1 is a block diagram illustrating an example environment for an embodiment of a system for subscriber aware network monitoring.

FIG. 1 illustrates an example environment for the system 100 for subscriber aware monitoring and the multiple interacting components in a computer communication network such as an IPv4 or IPv6 network. Subscribers 10 access a network 20, for example, the Internet, via computing devices 30, for example, modems, mobile devices, workstations, personal computers, laptops, tablet computers, or the like. The subscribers 10 connect through a channel, for example a wired channel or wireless channel (not shown). The wired channel may connect the computing device 30 to the network 20 via, for example, a cable modem termination system (CMTS) 40. It will be understood that this environment refers to cable networks but other types of connections and networks may work in a similar way. Further, the types of network may include various network types or designations, including for example, Local Area Networks (LANs), Wireless Local Area Networks (WLANs), Wide Area Networks (WANs), Public Switched Telephone Networks (PTSNs), mobile networks, the Internet or a combination of various networks.

The system 100 further includes at least one probe 120, 130, 140, 150, a memory module 160, for example a database, configured to store subscriber and IP data. In some cases, such as in the example environment in FIG. 1, the system 100 may include a separate probe for various network accesses, for example, a private traffic probe 120, an AAA probe 130 for Authentication, Authorization, and Accounting (AAA), a NAT probe 140 and a NAT traffic probe 150. In this example, the private traffic probe 120 and NAT traffic probe 150 are configured to determine identifying data from packets or related to packets within the traffic flow and query data from the memory module 160. Identifying data may be, for example, a source IP address, the protocol, the source port number, a Network Identifier, or the like. The AAA probe 130 and NAT probe 140 (sometimes referred to as network probes) are configured to process AAA streams and NAT streams and handle changing relationships between packet-identifying data and session identifier and subscriber identifier. In some cases, at least one probe may be associated with or may be included as part of a subscriber aware switch. In some cases, the at least one probe may reside within a single computer. In other cases, the at least one probe may reside on separate computers.

The system 100 may include an application programming interface (API) 170 to allow at least one network server 110 or external third party network device to access data of the system 100 and the data residing in the database 160. The network interface 170 may be configured to allow servers 110 to query data related to subscribers, for example, a subscriber ID, an IP address, a network identifier, or other like data. The network interface 170 may be further configured to allow servers 110 to store data related to subscribers. The data stored in the memory module 160 may also be queried by at least one network probe to retrieve subscriber data, as detailed herein. In some cases, the server 110 may be a component of the system 100 and may be accessed by, for example, a user interface (not shown).

In the example environment in FIG. 1, the system 100 is further configured to interact with other network devices, for example, an access gateway 50, a Carrier Grade NAT CGN 60 and a switch 70. The system 100 may interact with other network devices (not shown), for example, a firewall, a router, or the like.

The system 100 is intended to provide a benefit by allowing a single probe or a plurality of probes to manage multiple overlapping domains. This benefit is intended to provide corresponding capital and operational cost reductions due to requiring less equipment. It also becomes feasible to deploy subscriber aware monitoring on the Internet side of a CGN device 70 or other NAT/NPAT device, which may be more convenient and economical. Furthermore, it is intended that a single probe or a plurality of probes for multiple domains, as used by the system 100, has the information required to make better, holistically-derived decisions.

Figure 2:
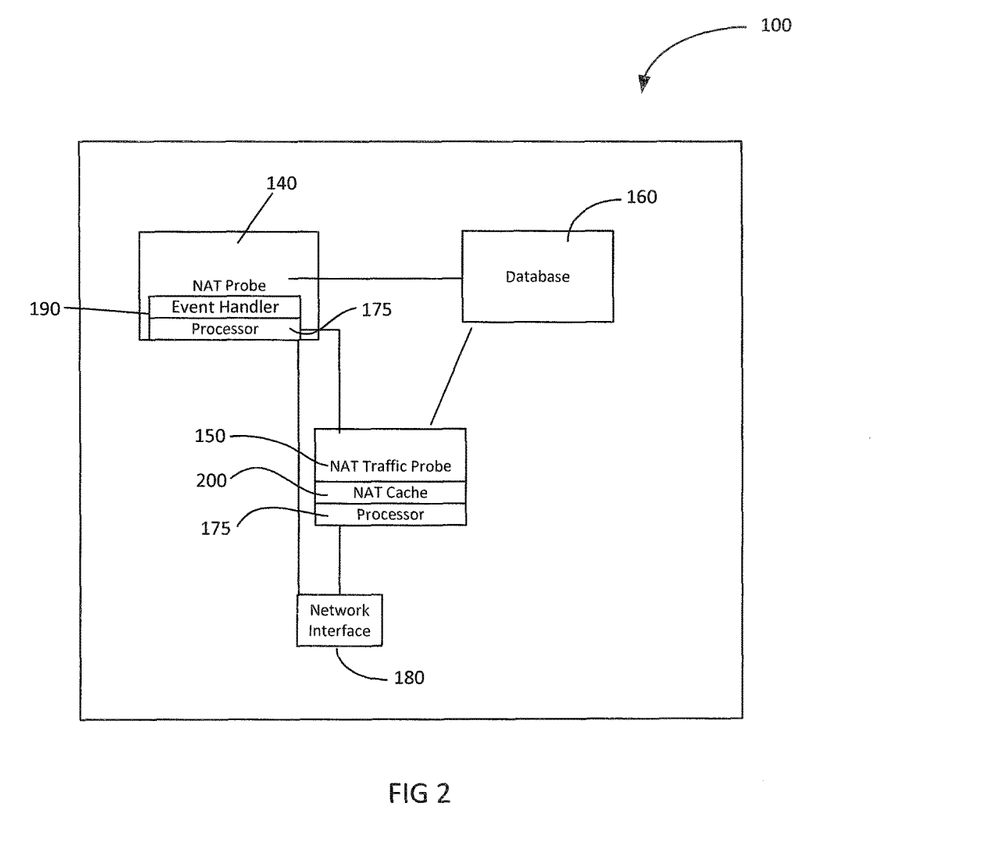
FIG. 2 is a block diagram illustrating an embodiment of a system for subscriber aware network monitoring.

FIG. 2 illustrates an example embodiment of the system 100 for use with a NAT device. It will be understood that other embodiments of the system 100 may further be configured for a private LAN or VLAN, or configured to be used with both a NAT device and use with a private LAN or VLAN as detailed herein.

Referring to FIG. 2, the system 100 includes the NAT probe 140, configured to update tables within the database 160. The NAT traffic probe 150 is configured to query the database 160 in relation to subscriber and IP session data when determining and comparing identifying data from a packet from the traffic flow. The system 100 further includes at least one processor module 175 for executing instructions for the system 100. The system 100 also includes at least one network interface 180 configured to send and receive data through the network 20. In some cases, the network interface 180 for the system and the application programming interface 170 may be an integrated component. In some cases, the elements of the system 100 are distributed, as shown in FIG. 1, and may each include a separate processing module and network interface. In other cases, the components of the system 100 may reside on distinct special-purpose or general-purpose computers, on a single computer, or some combination of the above.

The NAT probe 140 includes an event handler 190 configured to run at least one script on the receipt of a predetermined type of message from the CGN 60. The NAT traffic probe 150 includes a NAT cache component 200, configured to aid in determining and/or comparing identifying data from the packets to subscriber and session data retrieved by the system 100.

In embodiments of the system 100 for use with a private LAN or VLAN, the system 100 includes the private traffic probe 120 and the AAA probe 130. The private traffic probe 120 and AAA probe 130 provide mapping to associate network identifiers and private IP address with subscriber identity.

In some cases, the system 100 is intended to provide enhanced performance and scalability. In particular, by having a distributed system 100 as opposed to having a probe embedded within a network device, the distributed system 100 may remain independent from the other network components such that if a single component or probe stops functioning or otherwise breaks, the traffic may be properly flowed to the subscriber, as the probe does not direct the traffic. Further, the system 100 is intended to allow the probes to monitor multiple NATs and/or private networks, thus allowing for the addition of another NAT or private network without requiring a further system for monitoring subscriber traffic on the new network.

In some cases, the system 100 may include both AAA probe 130 and NAT probe 140 and may receive traffic flow and identifying data from both the private traffic probe 120 and the NAT traffic probe 150. In this case, the system 100 may be for use with a NAT device as well as for use for a private LAN or VLAN. It will be understood that the combination of the probes may vary depending on the network in the ISP environment and the manner in which IP addresses are issued to subscribers.

Since the NAT probe 140 and AAA probe 130 are not participants in the creation of distinct virtual and real networks or in the relations created by the NAT/NPAT device, the NAT probe 140 and AAA probe 130 are configured to obtain the relations from other equipment. The system 100 and the at least one probe are intended to provide valuable reporting, quota enforcement, billing and lawful interception, as detailed herein.

Unlike a router or other network device, a network or traffic probe is intended to be an overlay of the network and does not direct traffic flow or make decisions with respect to the flow of the traffic on the network. The system 100 and the at least one probe are intended to provide further awareness with respect to subscriber use of the network as opposed to conventional systems, that may be more similar to delivery systems which do not provide subscriber awareness. The system 100 is intended to provide the subscriber awareness in real time, without the requirement of reviewing historical logs to determine subscriber information.

The system 100 is intended to be deployed within an existing network to provide additional capabilities to the network, examples being demographic reporting, quota enforcement, pre-paid charging, post-paid charging, traffic quality-of-service measurement, network congestion detection, class-of-service differentiation and abuse of acceptable-use or detection of contract violation.

The database 160 is configured to store data related to IP sessions, session attributes, NAT relations and subscriber attributes. The database 160 is further configured to store data received from the at least one probe, for example the AAA probe 130 or NAT probe 140. The database 160 may be queried or read by, for example, the system components of the private traffic probe 120 and/or the NAT traffic probe 150.

In an example embodiment, the database 160 contains logical tables, for example a table related to IP sessions "IP_SESSION", another related to IP session attributes "SESSION_ATTRIBUTES" and another related to NAT Relations "NAT_RELATION". The tables included herein are presented here in a simple form, and may also have various embodiments that would be obvious to one skilled in the art, including the use of non-relational or NoSQL databases as well as the use of sharding or partitioning to improve scalability, availability and reliability. The tables included herein are intended to provide an example of the data stored and queried by the system 100 and are not intended to limit or restrict the data that may be stored or queried by the system 100. The tables are intended to be illustrative of the possible columns and data types that may be stored by the system 100 and it will be understood that the data type and column description may vary depending on, for example, the environment of the system 100, the naming conventions of a business, an administrator, or the like.

Table 1 illustrates an example of an IP_SESSION Table. This table is intended to relate an IP address in a particular network to a physical subscriber.

TABLE 1

| Column | Data type |
| --- | --- |
| Subscriber IP | IP address |
| Network Identifier | Number |
| Session ID | Number |
| Subscriber ID | String |
| Assigned Time | Timestamp |

In the table above, the primary key of IP_SESSION is the tuple of Subscriber IP and Network Identifier, so there will not be multiple records having this same primary key. The Subscriber IP is an IP address assigned to the subscriber and may be private or public. The Network Identifier is a number assigned to the network that the Subscriber IP is allocated within. This number is intended to have relevance to the ISP, for example, may be a distinct Network Identifier corresponding to each private network. In another embodiment, the Network Identifier may not be a number but may be a named network and the data type may, therefore, be a string.

In another embodiment, the IP_SESSION table is indexed by a Subscriber IP Prefix, Subscriber IP Prefix Length and Network Identifier, allowing an entire subnet of IP addresses to be delegated to a subscriber with a single row in the table. A lookup from an IP address matches to a row with the first prefix-length bits of the prefix and address being equal. In this case, it will be understood that overlapping ranges are not permitted.

In one example, the Network Identifier may be given the value of 0 to represent the space of public IP addresses (i.e. the Internet). Therefore a request to this table that provides only an IP address as a key can implicitly use Network Identifier of 0 in the lookup, providing a compatibility mode with devices that are not yet private-network-aware. Although another value for the public IP addresses may be used, the use of the Network Identifier of 0 is intended to provide backwards compatibility for the implementation of the system 100.

In some cases, networks or older systems provided by ISPs may not have the capabilities of reviewing or differentiating between IP traffic for different subscribers using the same IP address, and may be only capable of dealing with single use unique IP addresses. By implicitly providing the Network Identifier of the public IP address as a zero value, the traffic can still be directed by these older systems.

The Session ID is a unique number representing an instance of a subscriber's assignment of an IP address. The Session ID value may or may not have a meaning outside of the database 160. The Subscriber ID is intended to be a unique name for an ISP's subscriber or customer and has meaning to the service provider to allow the service provider to identify the subscriber.

The Assigned Time represents the time that the row in the table was created or the IP session started, facilitating resolution of messaging race conditions and historical reporting of sessions. In some cases, this time may be extracted from AAA messages. In other cases, the time that the row is created in the table may be used as the Assigned Time.

Table 2 illustrates possible columns that may be used for a history table based on the IP_SESSION table described above. When the subscriber has ended the IP session, the data stored in the IP_SESSION table may be stored in the history table as a record of the IP session.

TABLE 2

| Column | Data type |
| --- | --- |
| Subscriber IP | IP address |
| Network Identifier | Number |
| Session ID | Number |
| Subscriber ID | String |
| Assigned Time | Timestamp |
| End Time | Timestamp |

The contents of this table represent ended sessions that are warehoused for requests that occur after the session is ended. For example, an ISP may be obligated to provide law enforcement agencies with answers to questions about which subscriber had a certain IP address at a certain time, within a given network. This query would be indexed by Subscriber IP, Network Identifier and a Timestamp to fall in the range of Assigned Time and End Time.

Table 3 illustrates an example of the SESSION_ATTRIBUTES table.

TABLE 3

| Column | Data type |
| --- | --- |
| Session ID | Number |
| Attribute Name | String |
| Attribute Value | String |

The primary key of the SESSION_ATTRIBUTES table is the tuple of Session ID and Attribute Name; there may not be two records having the same primary key tuple. The SESSION_ATTRIBUTES table may be joined to the IP_SESSION table via the Session ID column in each, resulting in a number of attributes per Session.

In some cases, a constraint on the SESSION_ATTRIBUTES table states that there must be a row in the IP_SESSION table having the Session ID. Therefore removal of a row from the IP_SESSION table may cause automatic (cascade) deletion of rows from the SESSION_ATTRIBUTES table. In other cases, when a row in the IP_SESSION table is moved to the history table, the corresponding row in the SESSION_ATTRIBUTES table may be moved to a corresponding history table.

An example use of SESSION_ATTRIBUTES is to indicate an attribute of whether a session is "roaming". Determining whether a subscriber is roaming may be used in billing and accounting business logic by the ISP.

Data may be retrieved from IP_SESSION and SESSION_ATTRIBUTES by a plurality of interfaces, for example:
1. Query by the tuple of Subscriber IP and Network Identifier, resulting in the Session ID, Subscriber ID, Assigned Time and the list of Attribute Name/Value pairs having the same Session ID.
2. A client to this database may also elect to receive notification of all changes to this database.

When a change is made to either of the IP_SESSION or SESSION_ATTRIBUTES tables, the system 100 sends a notification to the at least one traffic probe, for example the private traffic probe 120 and/or the NAT traffic probe 150. The system may further send notification to other clients of the database 160. In a particular example, the system 100 may send one of the following messages corresponding to the change occurring in the database 160:

Create (IP Address, Network Identifier, session ID, subscriber ID, assigned time list of (attribute name, attribute value))
Update (IP Address, Network Identifier, session ID, subscriber ID, assigned time list of (attribute name, attribute value))
Delete (IP Address, Network Identifier)

Table 4 provides example columns and data types for a NAT_RELATION Table, which is intended to store data related to NAT relations or NAT associations.

TABLE 4

| Column | Data type |
| --- | --- |
| Protocol | Unsigned Number |
| Public IP | IP address |
| Public low port | Unsigned Number |
| Public high port | Unsigned Number |
| Private IP | IP address |
| Private Network Identifier | Number |
| Assigned Time | Timestamp |

In the above example table, the primary key may be the combination of the protocol, public IP and port range. For a given record with tuple of protocol and public IP, there may not be any other records with the same protocol and public IP in which the low port and high port overlap the given record. If the system 100 attempts to insert a new record that violates the constraints, any conflicting older records (according to the Assigned Time) may be removed to allow the new record to be accepted, if there are no conflicting newer records.

Data may be retrieved through a plurality of interfaces, for example:
1. A query by Public IP, Protocol and a port number will return any record for an exact match on Protocol, exact match on Public IP, and the port falling in the range of the Low and High port numbers. The constraints on the table or database allow for zero or one records to match.
2. A query by Private IP, and Private Network Identifier will return all of the records exactly matching those fields. This query can return zero or more results.
3. A query by Public IP will return all records of port ranges and protocols having the Public IP. This query is useful for quickly seeding a cache of a network or traffic probe observing the public IP address.

Each of the above requests causes the database 160 to fetch the data from the NAT_RELATION or equivalent table and create a response to the requestor, which includes a success/fail code and the requested data.

A client to the system 100, for example the ISP, may also elect to receive notification of all changes to this NAT_RELATION table. The system 100 may send Create, Update or Delete messages corresponding to the respective changes to the NAT_RELATION table.

A client to the database 160, for example the NAT traffic probe 150 may also elect to receive rows of IP_SESSION joined to NAT_RELATION by Private IP and Network Identifier upon changes to either NAT_RELATION or IP_SESSION. The Private IP column may contain standard private IP addresses, or IP addresses from the shared address space or other IP addresses that the ISP is translating with a NAT.

There are other functionally equivalent embodiments of this NAT_RELATION table that may be employed by the system. For example, there could be a record for each port rather than representing port ranges. In a simplified embodiment of the NAT_RELATION table, the port ranges may be constrained to being assigned in blocks (e.g., blocks of 64) and a block index could be used in place of the port range (block 0 is ports 0-63, block 1 is ports 64-127, etc.). In another simplified embodiment of NAT_RELATION table, the port ranges may be shared for all protocols and the Protocol field may not be needed.

The database 160 may further store a history table of the NAT_RELATION table. Table 5 provides an example of the columns and data types that may be stored in the history table.

TABLE 5

| Column | Data type |
| --- | --- |
| Protocol | Unsigned Number |
| Public IP | IP address |
| Public low port | Unsigned Number |
| Public high port | Unsigned Number |
| Private IP | IP address |
| Private Network Identifier | Number |
| Assigned Time | Timestamp |
| End Time | Timestamp |

The contents of this table represent ended sessions that are warehoused for requests that occur after the session is ended. For example, as stated above, the ISP may be obligated to provide law enforcement agencies with answers to questions about which subscriber had a certain IP address and TCP port at a certain time. This query would be indexed by Subscriber IP, Protocol=TCP, port=TCP port and a Timestamp to fall in the range of Assigned Time and End Time. The resulting Private IP and Private Network Identifier would be joined to the IP_SESSION_HISTORY table to obtain the Subscriber ID at the specified time.

The database 160 may further include a table related to subscriber attributes, for example, the SUBSCRIBER_ATTRIBUTES table shown in Table 6.

TABLE 6

| Column | Data type |
| --- | --- |
| Subscriber ID | String |
| Attribute Name | String |
| Attribute Value | String |

The primary key of the SUBSCRIBER_ATTRIBUTES table may be the tuple of Subscriber ID and Attribute Name and there may not be two records having the same primary key tuple. The SUBSCRIBER_ATTRIBUTES table may be joined to the IP_SESSION table via the Subscriber ID column in each, resulting in a number of attributes per Session.

The SUBSCRIBER_ATTRIBUTES table may not require a corresponding row in the IP_SESSION table as it is intended that the life-cycle of subscriber attributes extend across many sessions or IP assignments.

An example use of SUBSCRIBER_ATTRIBUTES may be to implement an attribute named "subscriber tier" that has possible values "gold", "silver" or "bronze". Another example is to have an attribute named "subscriber type" having possible values of "business" or "residential". The SUBSCRIBER_ATTRIBUTE table is intended to allow flexibility to store a plurality of attributes related to subscribers of the ISP.

Whenever a change is made to the SUBSCRIBER_ATTRIBUTES table, the database 160 sends a notification to the private traffic probe 120 and/or the NAT traffic probe 150. The database 160 may further send a notification to other components of the system 100 or to other clients of the database 160. For example, the system 100 may send one of the following messages corresponding to the change occurring in the database 160:

Create(Subscriber ID, list of (attribute name, attribute value))
Update(Subscriber ID, list of (attribute name, attribute value))
Delete(Subscriber ID)

The AAA probe 130 is intended to observe log records from an AAA server and translate these into entries in the IP_SESSION, and SESSION_ATTRIBUTES and SUBSCRIBER_ATTRIBUTES database tables.

The MA probe 130 may receive events from various pluggable protocol handlers and may receive a corresponding Remote Authentication Dial In User Service (RADIUS) message.

The AAA probe 130 is configured to review the input of the RADIUS message to determine session start/update/stop, to compute private IP, network identifier, subscriber ID and attributes. The AAA probe 130 is configured to run an event handler (not shown) each time an accounting message, for example, a packet of one of Dynamic Host Configuration Protocol (DHCP), General Packet Radio Service Tunneling Protocol Control (GTP-C) or RADIUS protocols, is received by the AAA probe 130. Each event may describe either an addition or deletion of an IP-to-Subscriber mapping. The event handler decodes the message and translates the message into addition or deletion of an IP_SESSION row. An addition may require the event handler of the AAA probe 130 to determine the fields of IP_SESSION, and optionally determine a set of pairs for the SESSION_ATTRIBUTES table. In a deletion, the event handler may determine the key: a Network Identifier and an IP address from the message. The system 100 extracts or derives the fields from the event into the database table columns, and issues the action of creating or deleting table rows.

The system 100 is intended to permit the decoding and translation to be configured in the field by means of an interpreted programming language, allowing rapid adaptation to different DHCP or RADIUS conventions, as shown in the script below. In some cases, the decoding and translating may be coded or hard-wired for a particular DHCP or RADIUS vendor and software version.

Below is pseudo-code for a RADIUS event handler for the AAA probe 130. It will be understood that field names and naming conventions may vary depending on the type of message received and the implementation of the event handler and the AAA probe 130.

on RADIUS accounting event:
Provision.Session.ProvisionSubscriber
(SubscriberID: RADIUS.Accounting-Request.User-Name,
NetworkID: RADIUS.Accounting-Request.NAS-Port,
IPv4.Address: RADIUS.Accounting-Request.Framed-IP-Address,
IPv4.Prefix: 32,
Presence: PROVISION_PRESENCE_LOGIN,
AssignTime: NowMs,
NetworkSource: NETWORK_SOURCE_RADIUS)

On session start or update, the AAA probe 130 may write the record of (Assign TimeSubscriber IP, network ID, session ID and subscriber ID) to database 160 table IP_SESSION. The AAA probe 130 may be further configured to write zero or more records of (session ID, attribute name, attribute value) to the SESSION_ATTRIBUTES table.

On session stop, the AAA probe 130 may delete the record keyed by (private IP, network ID) from IP_SESSION table, and cascade deletion of records in SESSION_ATTRIBUTES with the corresponding SESSION_ID. In some cases, the AAA probe 130 may be configured to move the record from the current table and store it in the corresponding history table. In other cases, the AAA probe 130 may wait a predetermined time after the session stops to move or delete the records.

The NAT probe 140 is configured to observe log records from a carrier-grade NAT (CGN) and translate these records into entries in the NAT_RELATION table in the database 160.

The NAT probe 140 receives events from the CGN 60 in some stream of messages, for example RADIUS, or syslog protocols, or the like.

The data below illustrates an example of a NAT log message:

2013-03-14
13:40:34 cgnat[FWNAT]:ASP_NAT_PORT_BLOCK_ALLOC:
100.64.123.4 ->
203.0.113.7:4096-4223

The NAT probe 140 is configured to run a script on the inputs, to determine which of create, update or delete action is required on the NAT_RELATION table, and to derive the fields of the NAT_RELATION record from the inputs. The event handler 190 for the NAT probe 140 may be configured to run each time a syslog record is written or RADIUS accounting message is issued by the NAT. Each event may describe an addition or deletion of an internal-to-external mapping. The event handler 190 decodes the message and translates the message into an action, for example an addition or deletion of a NAT_RELATION row.

The system 100 is intended to permit the decoding and translation to be configured in the field by means of an interpreted programming language, allowing rapid adaptation to different NAT vendors, for example the system 100 is intended to be able to interpret various formats of syslog messages. Further, the script run by the NAT probe is also intended to be configurable. In some cases, the decoding and translating could be coded or hard-wired for a particular NAT vendor and software version.

The data below is an example pseudo-code for converting the NAT syslog event into a NAT_RELATION. It will be understood that field names and naming conventions may vary depending on the type of message received and the implementation of the event handler 190 and the NAT probe 150.

```
on TextInput.NAT log event:
    Provision.Nat.Map (
        privateIP : StringToIp(TextInput.NAT.privateIpPrefix),
        privatePrefix : 32 ,
        publicIP : StringToIP(TextInput.NAT.publicIpPrefix),
        lowPort : Integer(TextInput.NAT.publicIpLowPort),
        highPort : Integer(TextInput.NAT.publicIpHighPort),
        Timestamp : NowMs)
```

On a new NAT port assignment, the NAT probe 130 is configured to write a record of (private IP, network ID, public IP, low port and high port) to NAT_RELATION. The database 160 determines which existing records to delete, if any, based on overlapping port ranges. In some cases, the database 160 may move the existing records to a history table instead of deleting the records.

When the CGN 60 signals the end of a port assignment, the NAT probe 130 may write a Delete message to the NAT_RELATION table. On receipt of the Delete message the database 160 may remove any records for which the given public IP address has the specified port range. In some cases, the database 160 may move the records to a history table.

Figure 3:
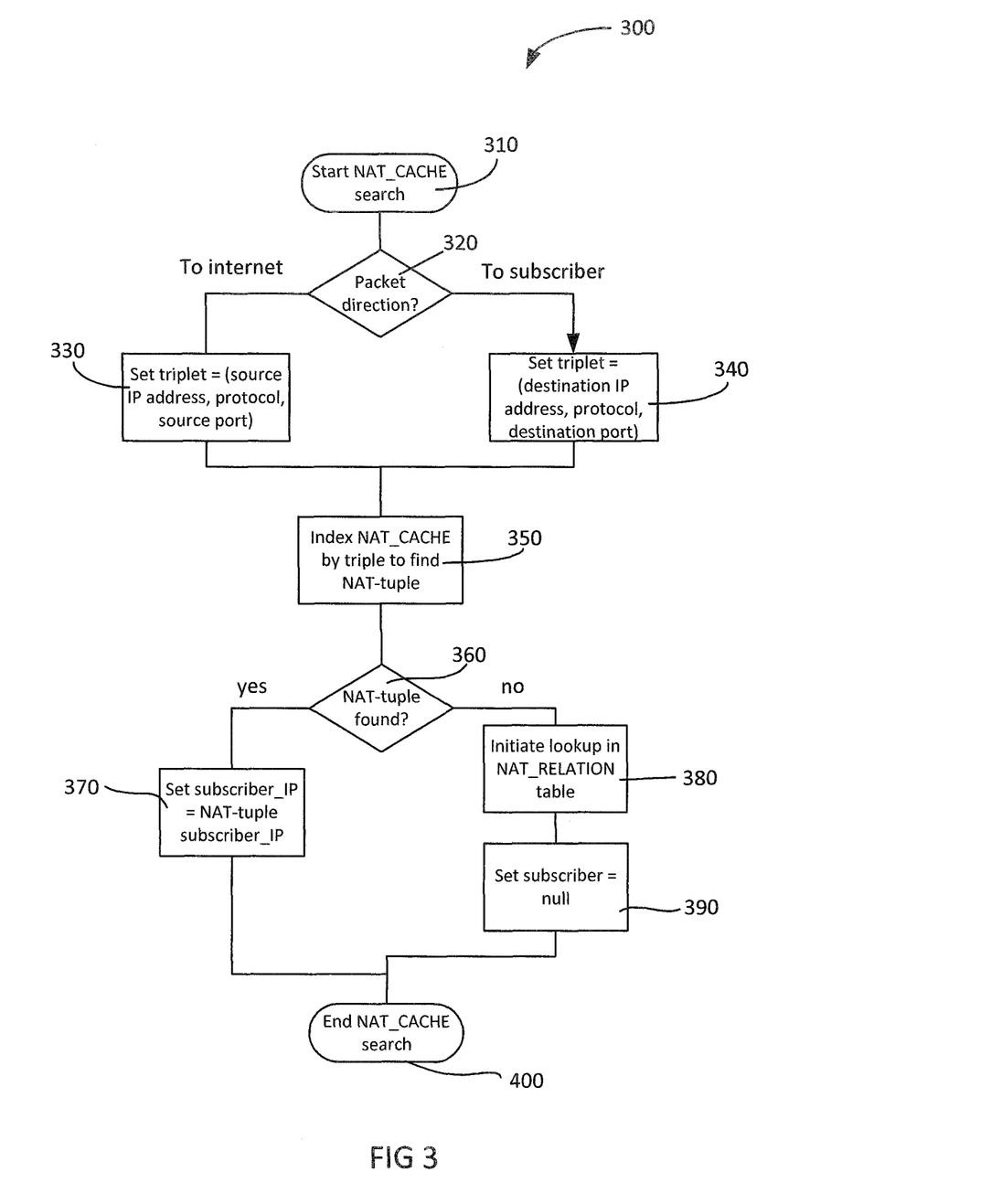
FIG. 3 is a flowchart of indexing an IP-port session according to an embodiment of a method for subscriber aware network monitoring.

FIG. 3 illustrates an embodiment of a method 300 for subscriber aware network monitoring. The method 300 illustrates an example using NAT traffic; however the method can be adapted for other types of traffic. The NAT traffic probe 150 is intended to observe IP traffic on the internet side of the CGN 60. As the CGN 60 causes multiple subscribers to share the same public IP address, the NAT traffic probe 150 uses port numbers, for example, TCP and UDP port numbers, or the like, to determine subscriber identity.

The NAT traffic probe 150 includes the NAT cache component 200, which maintains a data structure that permits a NAT-tuple of (public IP, protocol, low port, high port, subscriber ID, private IP) to be found from the input of the tuple of (public IP, protocol, port).

The NAT traffic probe 150 starts the NAT cache search at 310. At 320, the NAT cache component 200 determines the direction of the packet. When the NAT traffic probe 150 receives an IP packet bound for the Internet, the NAT traffic probe 150 extracts from the packet identifying data, for example, the source IP address, the protocol and the source port number, or the like, at 330. This information provides the triplet of IP address, protocol and port to access the NAT cache component 200.

When the NAT traffic probe 150 receives an IP packet bound for the CGN 60, (i.e. to the subscriber), the NAT traffic probe 150 extracts identifying data from the packet, for example, the destination IP address, the protocol and the destination port number, or the like, at 340. This provides the triplet of IP address, protocol and port to access the NAT cache component 200.

From the determined triplet, the IP address and port are assigned by the CGN 60. The NAT cache component 200 retrieves the NAT-tuple corresponding to this triplet, at 350. At 360, the NAT cache component 200 determines if the NAT-tuple is found. At 370, if the NAT-tuple is found then the NAT-tuple is used to attach a subscriber identity to the packet being processed. At 380, if the NAT-tuple is not found, the NAT traffic probe 150 requests the database 160 to search for an entry in the NAT_RELATION table. At 390, while this request is outstanding, the NAT traffic probe 150 processes the IP packet with a null subscriber identity.

When an outstanding response is returned from the database 160 with a valid row, the response is added to the NAT_CACHE, ready for the next packet (not shown in flowchart). Notifications from the database 160 may also update the NAT_CACHE. In some cases, the NAT traffic probe 150 suspends processing of the packet until a result is returned. In some case, a plurality of searches may be in progress simultaneously, as a plurality of subscribers may be accessing the network simultaneously.

In an alternative embodiment, the NAT traffic probe 150 may request all NAT_RELATION records for the public IP, to avoid the time required for subsequent lookups that may follow.

At 400, when the search response is received from the database, the NAT cache component 200 is updated.

The database 160 may send notifications when NAT_RELATION table is modified, allowing the NAT traffic probe 150 to maintain synchronization with the NAT_RELATION table stored in the database 160.

Figure 4:
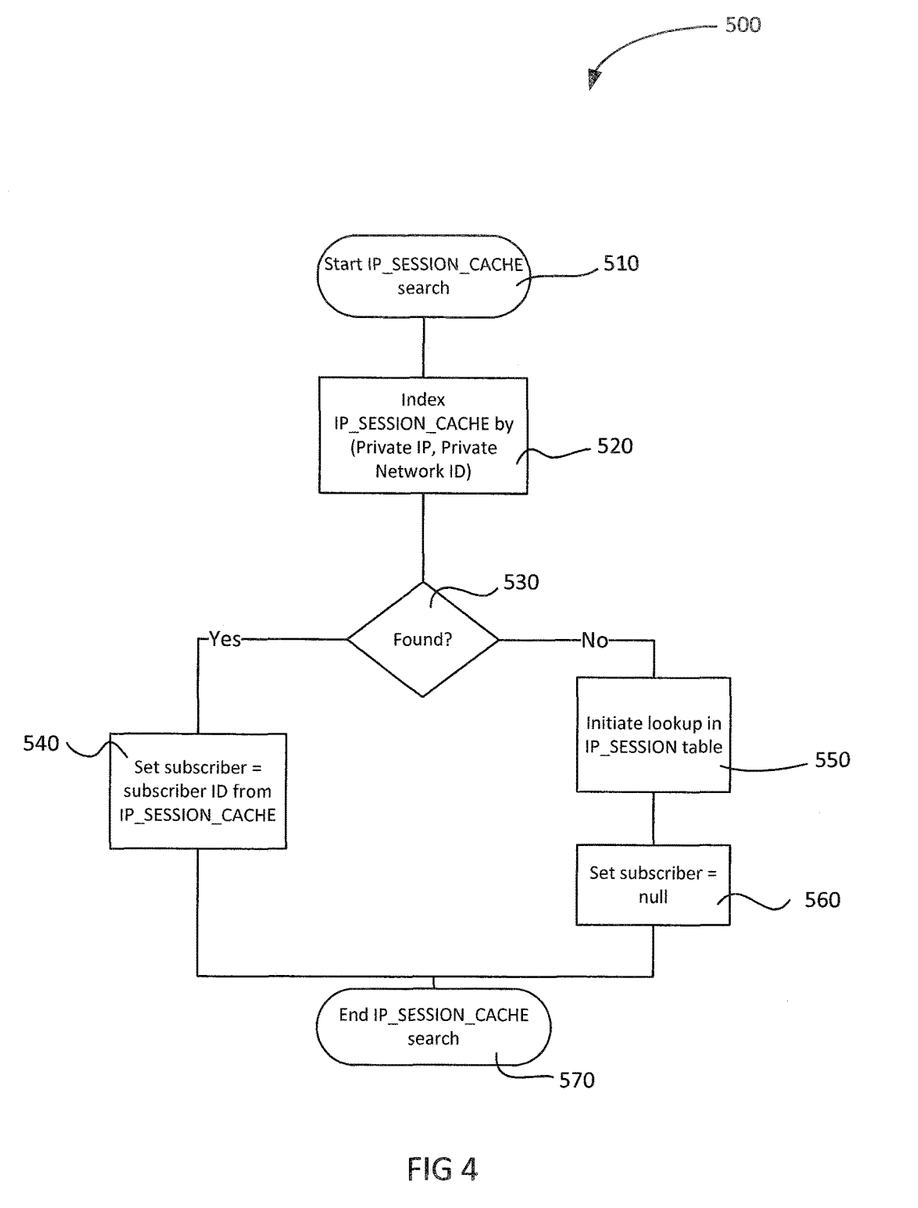
FIG. 4 is a flowchart of indexing an IP session according to an embodiment of a method for subscriber aware network monitoring.

FIG. 4 illustrates an example embodiment of a method 500 for searching and updating a local IP session cache component for the private traffic probe 120 in order to associate a subscriber with a packet. In some cases, the private traffic probe 120 may contain an IP session cache component that temporarily stores a local copy of records from the IP_SESSION table. At 510, the private traffic probe 120 starts the IP session cache component searching. At 520, once the cache component has retrieved the Private IP and Private Network ID, this tuple is used to index the IP_SESSION_CACHE by Private IP and Network ID.

At 530, the IP session cache component determines if the record is found. At 540, if it is found, the subscriber variable is given the ID from the local copy of the IP session table. At 550, if the record is not found, the private traffic probe 120 initiates a query for the record in the database 160. At 560, while the query is outstanding the private traffic probe 120 may set the subscriber variable to null. In other cases, the NAT traffic probe 150 may suspend the processing until the record is retrieved. Once the subscriber identification is known, the IP session cache component may end the search, at 570. Not shown in the flowchart is that when an outstanding response is returned from the database with a valid row, it is added to the IP_SESSION_CACHE, ready for the next packet. Notifications from the database also update the IP_SESSION_CACHE. In some case, a plurality of searches may be in progress simultaneously, as a plurality of subscribers may be accessing the network simultaneously.

In another example, the private traffic probe 120 observes IP traffic on the subscriber side of multiple carrier-grade NATs (CGNs) where the subscribers are allocated private or shared IP addresses that are translated to and from public IP addresses by the CGNs. Within the system 100 or even within a private traffic probe 120, the traffic for multiple private networks can be observed by the at least one private traffic probe 120 such that distinct subscribers can be allocated the same private IP address, albeit on distinct private networks.

The private traffic probe 120 contains a configurable rule engine configured to compute a Network Identifier from properties of each packet. For example, the Network Identifier may be computed from combinations of physical wires and VLAN IDs of the packet. This embodiment may be implemented with a two-dimensional lookup table having first index of physical wire and second index of VLAN ID. The table may be populated by configuration data. In an example, table 7 provides a two-dimensional lookup table to obtain Network Identifiers from physical wires and VLAN IDs.

TABLE 7

| VLAN ID | Physical wire | | | |
|---|---|---|---|---|
| | 1 | 2 | 3 | 4 |
| 1 | 0 | 1 | 1 | 10001 |
| 2 | 0 | 2 | 2 | 10002 |
| 3 | 0 | 3 | 3 | 10003 |
| ... | ... | ... | ... | ... |
| 4095 | 0 | 4095 | 4095 | 14095 |

In this example, all of physical wire 1 is mapping to Network Identifier 0 regardless of VLAN ID. This mapping is intended to designate Internet traffic. Also, physical wires 2 and 3 both have the same mappings, for instance meaning that VLAN ID 1 on physical wire 2 is the same private network as VLAN ID 1 on physical wire 3.

Once the Network Identifier is calculated, the tuple of (Network Identifier, Private IP) is sent in a "lookup" request to the IP_SESSION_CACHE table. The result is the desired Session ID and Subscriber ID.

In some cases, there may be a mode of configuration in which the entire table is populated with the same Network Identifier. This configuration is intended to have utility; for example, if different private traffic probe 120 instances have different Network Identifiers set, different probe instances may share the database while IP address overlap exists between the instances but not within an instance. This configuration may be referred to as "Cluster Mode" because each cluster has a single Network Identifier.

The private traffic probe 120 may further include an IP session cache component, similar to the IP session cache component for the NAT traffic probe 150, which is intended to store copies of the IP session records locally.

Although the functions of the private traffic probe 120 and NAT traffic probe 150 have been described separately, the system may include the two functions in a single probe. In some cases, the single probe may be provided on a single device, along with a traditional module for processing public IPv4 and IPv6 traffic.

Figure 5:
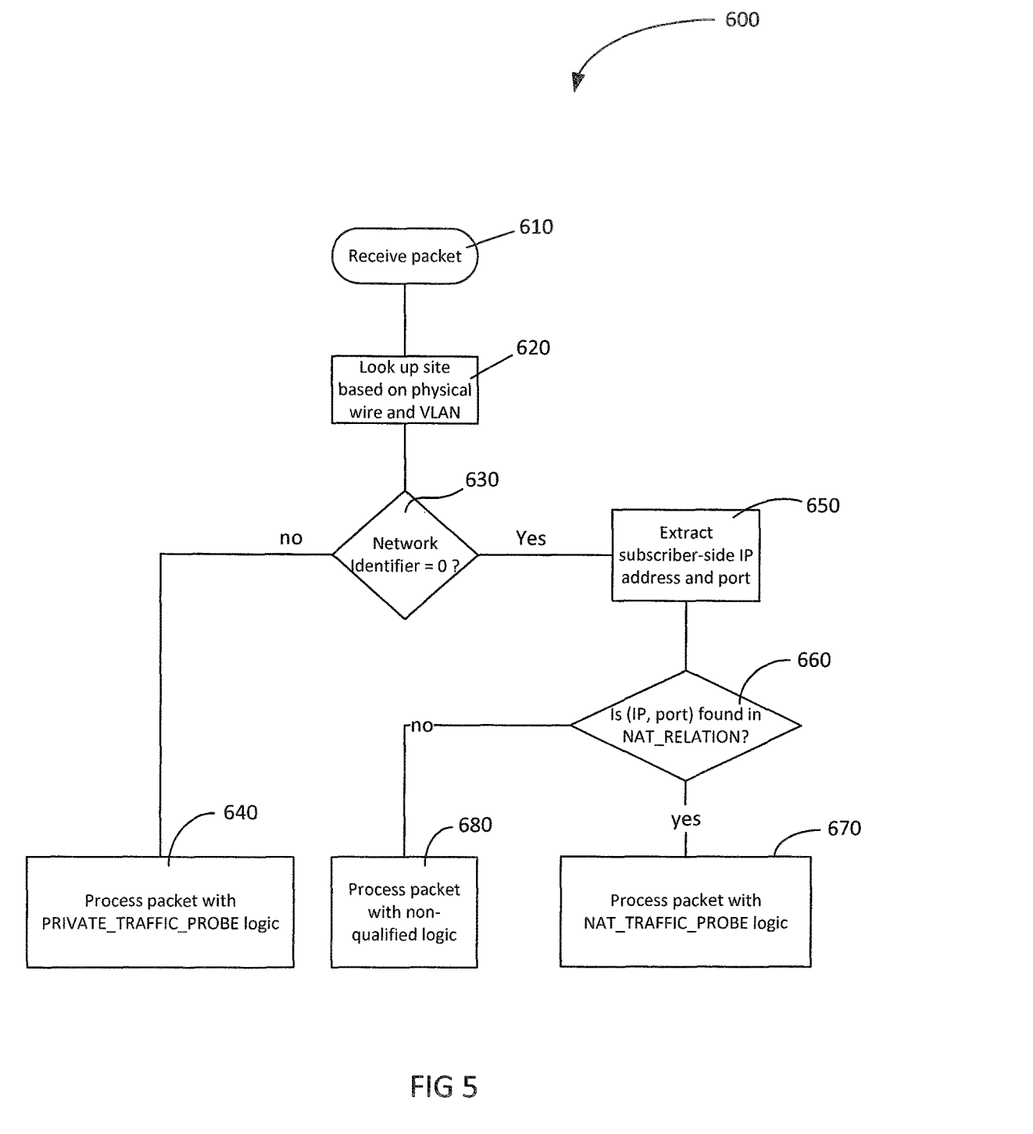
FIG. 5 is a flowchart of selecting an indexing method according to an embodiment of a method for subscriber aware network monitoring.

FIG. 5 illustrates a flowchart of a method 600 for subscriber aware network probe using a private traffic probe 120, a NAT traffic probe 150 and other processing for public IPv4 and IPv6 traffic. Within a combination system, some decision logic can be provided to determine which function should process each packet.

At 610, a packet is received by the system 100 and the system 100 retrieves identifying data from the packet. At 620, the system performs a site lookup based on the physical wire and VLAN Identifier. At 630, the system 100 determines the Network Identifier. If the Network Identifier identifies the packet as from a private IP address, the packet is processed by the method 500 as detailed above, at 640.

If the Network Identifier identifies the packet as being from a public IP address, for example the Network Identifier is 0 implying the packet is on the public Internet, the system 100 extracts the subscriber IP address and port at 650. The system 100 determines whether the IP and port identification is found in the NAT_RELATION table, at 660. At 670, if the IP and port identification is found, the packet is processed by the NAT traffic probe 150, using the method 300 as detailed above. At 680, if the data is not found in the NAT_RELATION table, the packet may be processed with a traditional module for IPv4 or IPv6 traffic with non-qualified logic. The system 100 is configured to provide business logic on the results of the data identified by the at least one probe.

One example of a use for the system 100 is for the generation of business intelligence reports. These reports may be based on data collected per subscriber, to identify classes of subscribers, to identify quality of subscriber experience and to identify time-based usage patterns of subscribers. Without accurate subscriber awareness of private IP addresses and NAT associations, these reports can be very difficult to prepare in an accurate fashion.

For example, a conventional probe deployed on the Internet side of a NAT will typically consider each NAT IP address to be a single subscriber and drastically under-report the number of subscribers using the network. On the other hand, the system 100 described herein, is intended to accurately report the number of subscribers as the system 100 can identify individual subscribers, even those using the same IP address. When business decisions are made on the basis of reports, large amounts of money are put at risk. Accurate reporting is essential to reduce the risk.

Another example of a use for the system 100 is to produce reports to aid in capacity planning and diagnostics. When reports on network plans are produced, the reports use data about numbers of subscribers and data showing subscriber experiences, this data should be accurate in order to produce appropriate decisions. Decisions made from bad data cause waste and could potentially cause loss of network access to customers.

For example, if a conventional probe is observing multiple private networks the probe would report multiple subscriber IP addresses as though it were a single subscriber, causing under-reported subscriber activity on a network. Capacity planning based on under-reported subscriber counts could lead to under-provisioning and failure of subscribers to access a network. Such a problem could lead to loss of customers and potentially financial penalties for failure to perform according to contract. The embodiments of the system and method disclosed herein are intended to produce accurate subscriber awareness, which is quite critical in operations reporting. The embodiments of the system and method are configured to provide an aggregated total of subscribers associated with packet on the network and are therefore intended to provide an accurate subscriber count for capacity planning.

A further example for a use of the embodiments of the system and method disclosed herein is in reporting and determining application aware quotas and application aware billing. ISPs want to collect revenue for services provided to customers. If any contract other than flat-rate billing is desired, a service provider should monitor how much internet traffic has been generated by each customer. Either a plan will result in a particular quota, or billing will vary based on usage.

To create accurate billing, it is important that usage-measuring systems correctly attribute each and every packet to the correct customer/subscriber. A conventional probe system that has an incorrect model of subscriber awareness will produce incorrect usage reports. For example, counting usage per IP address on multiple VLANs without consideration of the VLAN differences will lead to a single customer billed for usage by all subscribers on the VLANs, an over-billing. Over-billing customers or enforcing quota based on incorrect data may cause problems for an ISP such as tarnished reputation, loss of customers and regulatory fines.

Similarly, using a conventional probe on the internet side of a NAT may be unable to attribute the collected usage to any subscriber whatsoever. Inability to count usage leads to inability to bill customers, which is a direct loss of revenue.

The embodiments of the system and method described herein are intended to provide Internet usage calculated as packets arrive at the probe by assigning each packet to a subscriber ID as described above, then summing the packet size into one of the receive (Rx) or transmit (Tx) counters dedicated to the subscriber ID. Periodically or on-demand the counter values may be reported by the system to an external billing system (not shown).

In a further example, the embodiments of the system and method described herein are intended to aid in lawful interception. Service providers are often obligated to provide packet captures or connection information to law enforcement agents who present warrants. Warrants may name a subscriber or may name an IP address. It is clearly important that the correct packets be delivered to law enforcement. A conventional system of probes that is not subscriber aware may not be able to collect the correct packets either within a system of private networks or from the internet side of a NAT. The system described herein is intended to provide accurate information that correctly identifies and associates packets with a subscriber and an IP address with a qualifier of the IP address if the IP address is not unique.

A lawful interception is implemented by first matching each packet to a subscriber identifier as disclosed herein. Then the subscriber ID of the packet is compared to a list of active subscribers to be intercepted and the packet sent to the capture destination for that subscriber. In some cases, the subscriber may be identified in real time as the subscriber transmits and receives packets. In other cases, the subscriber may be identified via the history tables stored in the database and queried by an external system after the fact to determine the subscriber associated with a specific packet or specific IP session.

In some cases, the system 100 includes a subscriber identification application programming interface (API). The ISP may interface with the system 100 through the API to access the data stored by the system 100. The API is intended to allow easy configuration of the system 100 to allow the ISP to retrieve subscriber identification and IP session related data. This configuration is intended to provide the ISP with access to the system 100 to determine accurate network data which may be used in the applications detailed above and for other applications where the ISP may require accurate subscriber and IP session data.

The examples above illustrate the system 100 in an in-line deployment. In some cases, the system 100 may be deployed off-line. As the components of the system 100 do not route the traffic flow, the system 100 may be deployed offline and may have copies of the packets routed to the system 100.

The system 100 and method are further intended to support configurable rules about network segments, VLANs, and the like. Providing support for configurable rules is intended to allow for the system 100 to be easily adaptable to changes in the network and changes in network policy.

The system 100 and method are further intended to provide support for scriptable mapping from RADIUS or DHCP to IP_SESSION and SESSION_ATTRIBUTES relations and scriptable mapping from NAT input events to NAT_RELATIONs.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

We claim:

1. A method for subscriber aware network monitoring for a network having at least one subscriber with a non-unique IP (Internet Protocol) address during a session comprising:
   determining non-unique subscriber data and session data from network traffic, at a network probe;
   retrieving subscriber identifying data from a packet, at a traffic probe;
   mapping the determined non-unique subscriber and session data to the subscriber identifying data to determine a subscriber associated with the non-unique subscriber and session data.

2. The method of claim 1 wherein the identifying data comprises a combination of an IP address and port data.

3. The method of claim 1 wherein the identifying data comprises a combination of an IP address and a network identifier.

4. The method of claim 3 further comprising:
determining whether the identifying data from the packet indicates that the packet is from a public IP address; and
associating the packet with the subscriber having the public IP address.

5. The method of claim 1 further comprising producing network capacity planning reports based on an aggregated total of the mapped data.

6. The method of claim 1 further comprising determining billing based on the mapped data.

7. The method of claim 1 further comprising:
storing the identifying data and subscriber associated with the packet; and
retrieving historical records indicating a relation between the subscriber and the non-unique IP address.

8. A system for subscriber aware network monitoring for a network having at least one subscriber with a non-unique IP (Internet Protocol) address during a session comprising:
at least one network probe configured to determine non-unique subscriber data and session data from network traffic;
at least one traffic probe configured to retrieve subscriber identifying data from a packet; and
a processor module configured to map the non-unique subscriber and session data to the subscriber identifying data to determine a subscriber associated with the non-unique subscriber data and session data.

9. The system of claim 8 wherein the identifying data comprises a combination of an IP address and port data.

10. The system of claim 8 wherein the identifying data comprises a combination of an IP address and a network identifier.

11. The system of claim 10 wherein the processor module is further configured to:
determine whether the identifying data from the packet indicates that the packet is from a public IP address; and
associate the packet with the subscriber having the public IP address.

12. The system of claim 8 wherein the processor module is further configured to produce network capacity planning reports based on an aggregated total of the mapped data.

13. The system of claim 8 wherein the processor module is further configured to determine billing based on the mapped data.

14. The system of claim 8 further comprising:
a memory module configured to store the identifying data and subscriber associated with the packet; and
the processor module further configured to retrieve historical records indicating a relation between the subscriber and the non-unique IP address.

15. The system of claim 8 wherein the network probe is a Network Address Translation (NAT) probe and the traffic probe is a NAT traffic probe.

16. The system of claim 8 wherein the network probe is an Authentication, Authorization and Accounting (AAA) probe and the traffic probe is a private traffic probe.

17. The system of claim 8 wherein the system comprises:
at least two network probes, a Network Address Translation (NAT) probe and an Authentication, Authorization and Accounting (AAA) probe; and
at least two traffic probes, a NAT traffic probe and a private traffic probe.

18. The system of claim 8 further comprising:
a database configured to store data related to subscribers and IP sessions; and
a network interface configured to allow access to query the database.

* * * * *